Nov. 7, 1961    H. HEINZER    3,007,295
DEVICE FOR THE CONTINUOUS PRODUCTION OF WRAPPINGS
Filed June 23, 1960
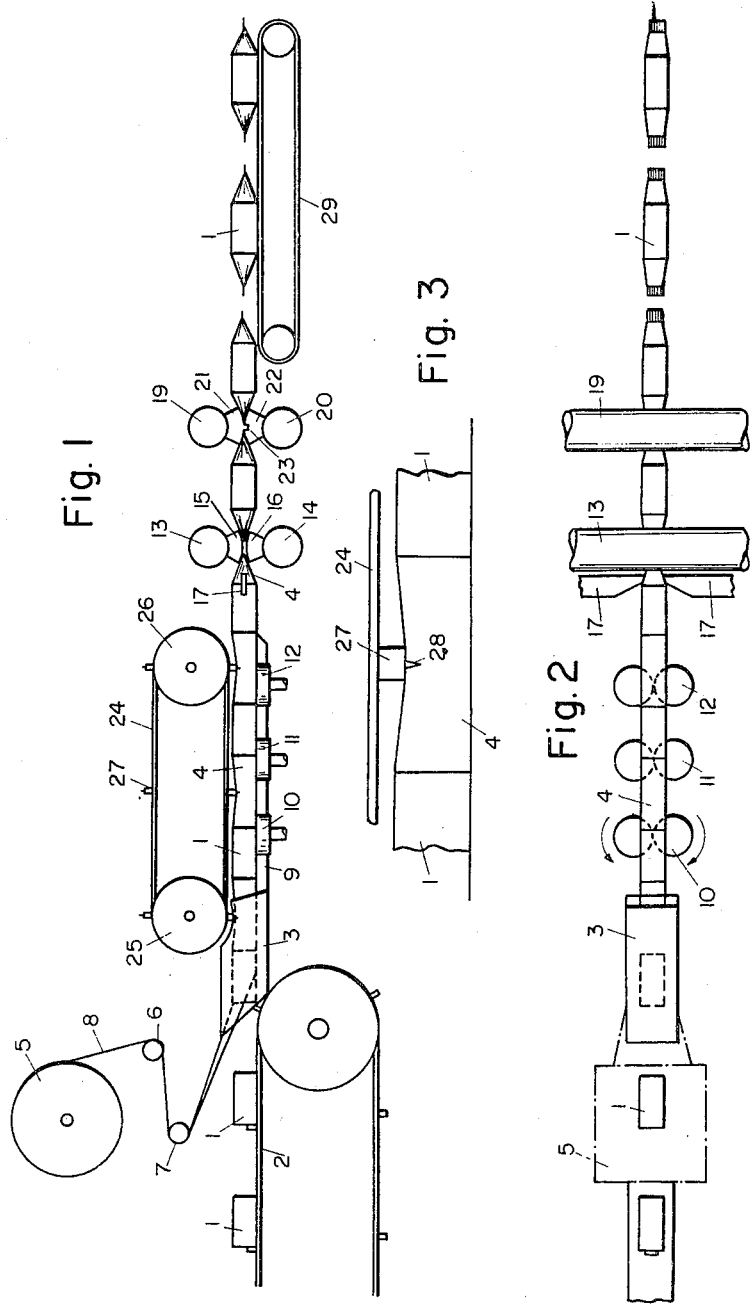

United States Patent Office 3,007,295
Patented Nov. 7, 1961

3,007,295
DEVICE FOR THE CONTINUOUS PRODUCTION
OF WRAPPINGS
Hans Heinzer, Neuhausen am Rheinfall, Switzerland, assignor to Schweizerische Industrie-Gesellschaft, Neuhausen am Rheinfall, Switzerland
Filed June 23, 1960, Ser. No. 38,165
Claims priority, application Switzerland Aug. 31, 1959
3 Claims. (Cl. 53—180)

The present invention relates to a device for the continuous production of wrappings, in which individual articles or articles composed of parts such as piles of bisquits are enclosed in a moving hose of wrapping material. Hitherto these articles were located inside the said hose by friction only whereby mutual displacement of individual articles or the falling apart of piled up articles could not be prevented, so that such articles were crushed when forming the transverse weld seams in the hose of wrapping material, causing waste.

The invention has the main object of overcoming this difficulty and of providing a device of the kind referred to wherein the said articles are positively located and properly spaced up to the formation of the transverse weld seams between them.

With this and other objects in view which will become apparent later from this specification and the accompanying drawing, I provide a device for continuously forming wrappings of articles, comprising in combination: supply means supplying the articles to be wrapped up, a folding chamber, wrapping material being supplied in strip form to the said folding chamber and being folded therein around the said articles in the form of a hose enveloping the same, conveyer means advancing the said hose, first welding means interwelding a longitudinal seam of the said hose of wrapping material, second welding means forming transverse weld seams therein between consecutive articles, cutter means severing the individual wrappings from one another, a holder device including an endless flexible member, running along the said hose between the said folding chamber and the said second welding means and acting on the side of the said hose opposite the said longitudinal seam, and elements arranged at uniform pitch on the said endless flexible member engaging the said hose and deforming the same inwardly between any consecutive articles, the said elements preventing a mutual displacement or falling apart of the said articles up to the formation of the said transverse weld seams.

Preferably the pitch of the said elements on the said flexible member is adjustable so as to match the size of the articles to be wrapped up. Prick points piercing the said hose for venting the air from it may be provided on the said elements, the vent holes thus formed being subsequently sealed again by the said second weld means, if desired.

These and other features of my said invention will be clearly understood from the following description of an embodiment thereof given by way of example with reference to the accompanying drawing, in which:

FIG. 1 is a diagrammatic side elevation of the device for the continuous production of wrappings according to the invention, FIG. 2 is a plan view of the device according to FIG. 1, and FIG. 3 illustrates on a larger scale diagrammatically an element inwardly deforming the hose of wrapping material.

The articles to be wrapped 1 are supplied by a conveyer mechanism in the form of an endless conveyer belt 2 at equal spacings, and are pushed into a folding chamber 3 wherein the wrapping hose 4 is formed. Wrapping material 8 is supplied in strip-form to the folding chamber 3 from a storage reel 5 over deflector rollers 6, 7. The wrapping material 8 is preferably paper with a coating of a thermoplastic weldable material. Alternatively a foil of thermoplastic material could be used.

In the folding chamber 3 the wrapping material is placed, in a manner known in itself, hose-shape around the articles 1 to be wrapped up, a protruding longitudinal seam 9 being formed. This longitudinal seam is engaged by the driven pairs of rollers 10, 11, 12 whereby the hose is conveyed along. At least one of the said roller pairs 10, 11, 12 is heated, for example electrically, and interwelds the longitudinal seam 9 while the hose is passing through it.

The hose 4 with the articles 1 enclosed then gets into a device for producing the transverse weld. This device consists of two rollers 13, 14 on which two segment-shaped heated jaws 15, 16 are arranged. The rollers 13, 14 are synchronously driven by the machine in such a manner, that the two jaws 15, 16 squeeze the hose 4 together and interweld the same always in the middle between any two consecutive articles 1. By laterally projecting jaws 17, which are likewise driven by the machine and are arranged shortly before the transverse welding station, the side walls of the hose 4 are slightly pinched inwardly between any two consecutive articles. A further synchronously driven pair of rollers 19, 20 on which likewise segment-shaped jaws 21, 22 are arranged, serves for after-pressing and severing the transverse weld. For this purpose the jaw 21 comprises a knife edge 23 which engages into a corresponding recess in the other jaw 22. The wrapped-up articles 1 are then conveyed along by a conveyer belt 29.

The embodiment described of the device forms a hose having a protruding longitudinal seam, which is engaged by the rotating pairs of rollers 10, 11 and 12 and is conveyed along by them. However, in cases where an ordinary lap seam lying in the plane of the wall of the hose is made, special conveyer means have to be provided for conveying the hose. For example continuously circulating belts come then into consideration, which act on two side faces of the hose.

The wrapping device described so far is known in itself and has only been described for completeness.

Between the folding chamber 3 and the device 13—16 for producing the transverse weld the articles 1 are held in the hose 4 only by friction. In order to prevent them from displacing themselves relative to one another, or in case of piled up bisquits to prevent them from falling apart, a holder device is arranged above the hose 4 which runs along with the same.

This holder device consists of an endless belt 24 running over two rollers 25, 26, which are likewise driven synchronously with the rest of the machine. On the belt 24, which may for example be formed by a roller chain, outwardly protruding elements 27 are provided, the pitch of which corresponds to the spacing of the articles 1 supplied and may be varied at will by refitting the same. During a revolution of the belt 24 the elements 27 engage, always in the middle between any adjacent articles 1, into the hose 4 and squeeze the same slightly inward. By the resulting deformation of the hose 4 the articles 1 are secured in their original position. Consequently they cannot displace themselves relative to one another, and piled up bisquits cannot fall apart.

Since air must escape from the hose 4 while the same is squeezed by the jaws 15, 16 it has been found convenient to provide the elements 27 with a prick point 28 (FIG. 3). The latter pierces at any time the hose 4 and leaves an aperture, through which the air can escape. When producing the transverse weld, this aperture is again sealed by welding in an air tight manner.

Instead of adjusting the spacing, i.e. the pitch of the individual elements 27, by hand, a mechanism may be provided, in which the pitch is automatically adapted to the spacing of the articles 1 supplied.

While I have described herein and illustrated in the accompanying drawing what may be considered a typical and particularly useful embodiment of my said invention, I wish it to be understood that I do not limit myself to the particular details and dimensions described and illustrated; for obvious modifications will occur to a person skilled in the art.

What I claim as my invention and desire to secure by Letters Patent is:

1. A device for continuously forming wrappings of articles, comprising in combination: supply means supplying the articles to be wrapped up, a folding chamber, wrapping material being supplied in strip form to the said folding chamber and being folded therein around the said articles in the form of a hose enveloping the same, conveyer means advancing the said hose, first welding means interwelding a longitudinal seam of the said hose of wrapping material, second welding means forming transverse weld seams therein between consecutive articles, cutter means severing the individual wrappings from one another, a holder device including an endless flexible member running along the said hose between the said folding chamber and the said second welding means and acting on the side of the said hose opposite the said longitudinal seam, and elements arranged at uniform pitch on the said endless flexible member engaging the said hose and deforming the same inwardly between any consecutive articles, said elements preventing a mutual displacement or falling apart of the said articles up to the formation of the said transverse weld seams.

2. A device as claimed in claim 1, wherein the pitch of the said elements on the said endless flexible member of the said holder device is adjustable.

3. A device as claimed in claim 1, comprising prick points mounted on the said elements and piercing the said hose.

No references cited.

Notice of Adverse Decision in Interference

In Interference No. 92,923 involving Patent No. 3,007,295, H. Heinzer, Device for the continuous production of wrappings, final decision adverse to the patentee was rendered Aug. 12, 1963, as to claim 1.

[*Official Gazette November 12, 1963.*]